United States Patent [19]
Green

[11] Patent Number: 6,166,494
[45] Date of Patent: Dec. 26, 2000

[54] DRIVE CIRCUIT ARRANGEMENT FOR A GAS DISCHARGE LAMP

[75] Inventor: Ian Macdonald Green, London, United Kingdom

[73] Assignee: Central Research Labs, Ltd., Hayes, United Kingdom

[21] Appl. No.: 09/355,841

[22] PCT Filed: Jan. 28, 1998

[86] PCT No.: PCT/GB98/00257

§ 371 Date: Sep. 7, 1999

§ 102(e) Date: Sep. 7, 1999

[87] PCT Pub. No.: WO98/35537

PCT Pub. Date: Aug. 13, 1998

[30]     Foreign Application Priority Data

Feb. 7, 1997  [GB]  United Kingdom .................... 9702555

[51] Int. Cl.⁷ ................................................ H05B 37/02
[52] U.S. Cl. ...................... 315/209 R; 315/284; 323/214; 323/215
[58] Field of Search ................................ 315/209 R, 194, 315/224, 225, 276, 277, 278, 283, 284, 291, 311, DIG. 7; 323/212, 214, 215

[56]           References Cited

U.S. PATENT DOCUMENTS

| | | | |
|---|---|---|---|
| 5,574,335 | 11/1996 | Sun ........................................... | 315/307 |
| 5,781,418 | 7/1998 | Chang et al. ............................ | 315/307 |
| 6,040,661 | 3/2000 | Bogdan .................................... | 315/224 |

*Primary Examiner*—Don Wong
*Assistant Examiner*—Thuy Vinh Tran
*Attorney, Agent, or Firm*—William H. Bollman

[57]           ABSTRACT

A drive circuit arrangement for a gas discharge lamp includes a) a self resonating inverting for providing a drive voltage across a load impedance, the inverter having a pair of field effect transistors which operate in anti-phase, b) a tank circuit for canceling the reactive component of the load impedance coupled to the inverter, c) a voltage division circuit which provides a given fraction of the drive voltage to the gates of the field effect transistors, and d) a phase shifting means comprising an inductance in series with the tank circuit for shifting the phase of the given fraction of the drive voltage. The voltage division circuit is provided with a voltage limiter which in operation provides a further phase shift to the given fraction of the drive voltage when the drive voltage exceeds a given threshold value, increasing the resonant frequency of the inverter and limiting the peak drive voltage.

7 Claims, 1 Drawing Sheet

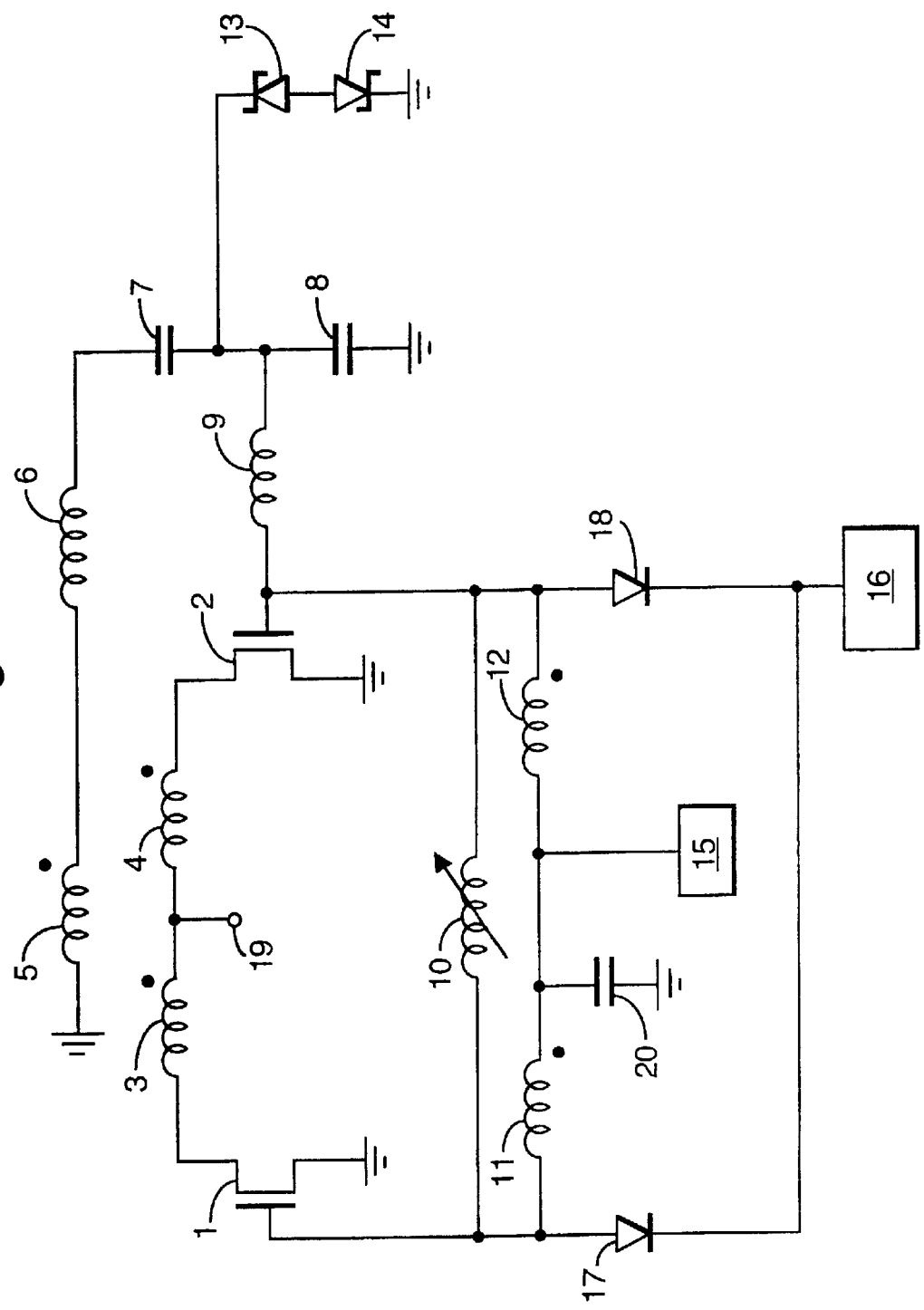

DRIVE CIRCUIT ARRANGEMENT FOR A GAS DISCHARGE LAMP

BACKGROUND OF THE INVENTION

1. Field of the Invention

This invention relates to a drive circuit arrangement for a gas discharge lamp, comprising a self resonating inverter for supplying a drive voltage across a load having an impedance with a reactive component, the inverter having a pair of field effect transistors which operate in anti-phase iri a first resonant circuit. It relates particularly, though not exclusively, to a drive circuit arrangement for inductively coupled backlights for displays, hazard beacons or vehicle signals.

2. Background of Related Art

Inductively coupled backlights having air cored coils must be driven at frequencies in the Megahertz range to avoid excessive coil losses. At these frequencies the gate impedance of suitable field effect transistors (FET's) is low, so that the gate drive currents are high in consequence. To minimize the drive power a resonant tank circuit may be provided which cancels the reactive component of the gate impedance at the driving frequency, and makes the gate input impedance look resistive.

A difficulty with known drive circuits occurs when the inverter is supplied by a d.c. voltage which is not constant—for example when supplied from a vehicle battery or the like. It has been observed that optimum circuit efficiency is not obtained under such conditions.

EP-A-0 696 157 discloses a low frequency ballast circuit for an arc discharge lamp. A difficulty with such known drive circuits relates to the loop phase shift of self-oscillating circuits having integral loads. A stable oscillator has a loop phase shift of either 0 or a multiple of $2\pi$. Since any combination of lossless components has a phase shift of either 0 or $\pi$, and since the load, being resistive, contributes a phase shift which is neither 0 nor $\pi$, an extra phase shift is required which may be, for example, $\pi/4$. A problem is how to provide this phase shift without incurring extra losses.

A third difficulty relates to discharge lamps as loads in a resonant circuit. Before the discharge strikes the lamp acts as a high impedance and the resonant circuit will have a high Q factor. The current and voltage from this resonant circuit can cause damage circuitry.

BRIEF SUMMARY OF THE INVENTION

According to the present invention, there is provided a drive circuit arrangement for a gas discharge lamp as specified in the claims. This arrangement can minimize circuit losses.

BRIEF DESCRIPTION OF THE DRAWINGS

FIG. 1 illustrates a circuit diagram of a preferred embodiment of the present invention.

DETAILED DESCRIPTION OF THE INVENTION

Embodiments of the invention will now be described, by way of example only, with reference to the accompanying circuit diagram of a preferred embodiment of the invention labelled FIG. 1.

Referring to FIG. 1, it shows a drive circuit arrangement for a gas discharge lamp, comprising a self resonating inverter for providing a drive voltage across a load. The inverter is constituted by field effect transistors 1 and 2 which operate in anti-phase together with a first transformer comprising inductances 3, 4 and 5, the load 6 comprising an impedance having a reactive component and a capacitor 7 which forms a resonant circuit together with the load, components 8 and 9 which form part of a feedback loop and gate coupling components 10, 11 and 12. These gate coupling components comprise a tank circuit for cancelling the reactive component of the impedance of a load (6) coupled to the inverter in use. A voltage division circuit comprising capacitors 7 and 8 provides a given fraction of the said drive voltage to the gates of the field effect transistors 1 and 2 in use. Phase shifting means for shifting the phase of the given fraction of the said drive voltage is provided by the inductance 9 feeding into the gate tank circuit. Diodes 13 and 14 comprise a voltage limiter which acts to restrict the peak resonant voltage as explained below. The circuit arrangement of FIG. 1 is also provided with an autobias circuit 15 which biases the transistor gates positive until the oscillation starts, and then returns the gate bias to zero, and an inhibit circuit 16 which pulls the cathodes of diodes 17 and 18 to ground when it is desired to stop the oscillations. The details of circuits 15 and 16 are not shown as suitable implementations of both circuits are well known to those skilled in the art.

The load impedance 6 will in practice typically consist of a spiral coil having an inductance positioned adjacent a glass envelope containing a gas in which a glow discharge is to be maintained. Power absorbed by the discharge will cause the load impedance to have a corresponding resistive component.

The values of typical components for the circuit of FIG. 1 are set out in the following table.

TABLE 1

| Reference Numeral | Component type | Value/Serial Number |
|---|---|---|
| 1, 2 | Power FET | IRF510, 100 V, 0.5Ω |
| 3, 4, 5 | Transformer 1 Windings | each 9 turns bifilar wound on 0.94 cm o.d 4C65 ferrite core |
| 6 | Coil | 12 turns of 0.4 mm PTFE covered wire wound on 28 mm diameter envelope. |
| 7 | Capacitor | 47 pF, 6 kV, COG |
| 8 | Capacitor | 1n5, 100 V, COG |
| 9 | Inductor | 1.6 µH |
| 10 | Adjustable Inductance | 1.4 µH nominal |
| 11, 12 | Transformer 2 Windings | each 5 turns on 0.94 cm o.d. 4C65 ferrite core |
| 13, 14 | Zener Diodes | 30 V, low power |
| 20 | Capacitor | 4.7 nF Ceramic |

These values result in oscillation of the circuit at approximately 10 Mhz with a power consumption of about 18 watts when a positive voltage of 24 volts is applied to terminal 19. Oscillation frequencies of between 1 and 20 Mhz, and applied voltages of between 6 and 40 volts are preferred.

The inductive load 6 and capacitor 7 are automatically driven close to resonance by the phase shifts in the circuit, and their values thus determine the operating frequency of the circuit arrangement. The resonant voltage across capacitor 7 is divided down by the much larger capacitance of capacitor 8. As a result, the voltage across 8 is proportional to the discharge running voltage. Since it is known that this voltage remains relatively constant over a wide range of powers it follows that the voltage across 8 also remains fairly constant over a wide range of supply voltages. Thus the voltage across 8 is suitable for driving the FET gates.

The phase shifts present in the circuit shown in FIG. 1 in operation are as follows:

From gate to drain of FET 2~π radians,
From drain of FET 2 to secondary winding of Transformer 1~0 radians,
From secondary winding of Transformer 1 to capacitor 8~3π/4 radians,
From capacitor 8 to gate of FET 2~π/4 radians.

The adjustable inductor 10 is part of the gate tank circuit, and is tuned or set such that the gate input appears resistive. It may, for example, be trimmed or adjusted on the circuit assembly line and need not be user adjustable. Since the effect of tuning it is to alter the power of the light source, it can conveniently be adjusted for a given or predetermined supply current.

If the inductor 9 is chosen such that the reactive component of its impedance is equal in magnitude to the resistance of the gate tank circuit, there will be a π/4 radian phase shift from capacitor 8 to the gate of transistor 2. This forces the loop phase from the secondary of Transformer 1 (i.e. inductance 5) to capacitor 8 to be 3π/4 radians, under which condition the self oscillating inverter will automatically run at a higher frequency than the resonant frequency of components 6 and 7, with the drain load of the transistors appearing inductive. This is required to provide efficient switching of the transistors.

When the circuit arrangement is first switched on there is no discharge present in the lamp envelope, and the resonant voltage across capacitor 7 attempts to rise to a very high value, due to the high Q of components 6 and 7. When this happens, diodes 13 and 14 conduct on voltage peaks, and the resulting resistive component across capacitor 8 causes a phase shift, the result of which is an increase in the frequency of the self oscillating inverter and thus limit the voltage across capacitor 7. The diodes do not dissipate significant energy.

If the diodes 13 and 14 had been connected across the gate of transistor 2 (which may appear more obvious) they have entirely the wrong effect—the phase shift is then in the opposite direction, the oscillation frequency decreases towards resonance, the voltage across capacitor 7 and the drain current of transistor 2 both increase substantially, and the power dissipation in the diodes is significant.

When selecting suitable transistors for use in the invention a high gate Q is essential, and the lower the gate capacitance the better. In the embodiment shown a transient gate rating to 35V is necessary.

The transformer comprising windings 3, 4 and 5 used in prototype tests was trifilar wound. The two drain windings are preferably bifilar wound; coupling to the third winding is less important.

Proper design of the lamp coil is a compromise between good coupling between the coil turns and good coupling to both the E and H field plasmas in the discharge in operation. The coil used in the embodiment of FIG. 1 had a Q of 220 at 10 Mhz.

The capacitor 7 must have a high Q at 10 Mhz, whilst capacitor 8 must look like a high Q capacitor at 10 Mhz. Inductor 9 used for the prototype had a Q of 200 and was wound on a Micrometals core. A much lower Q would also be acceptable.

For the transformer comprising windings 11 and 12, tight bifilar winding is essential, with short connections to the FETs (including the return path via the FET sources and capacitor 20, which must likewise be close to the FETs).

The adjustable inductor 10 used in the embodiment of FIG. 1 comprised 6 turns of 0.4 mm diameter wire in a 2.5 cm coil, having a Q of 150. A much lower Q would be acceptable.

The invention has particular application for lights powered by lead-acid or similar batteries, especially backlights for liquid crystal displays, or vehicle warning lights.

Finally, the content of the priority document for the present application (GB 9702555.5), especially the circuit diagram, is incorporated herein by reference.

What is claimed is:

1. A drive circuit arrangement for a gas discharge lamp, comprising a self resonating inverter for providing a drive voltage across a load having a reactive component, the inverter having a pair of field effect transistors which operate in anti-phase;

a tank circuit for canceling the reactive component of a load impedance coupled to the inverter in use;

a voltage division circuit which provides a given fraction of the drive voltage to the gates of the pair of field effect transistors in use; and phase shifting means for shifting the phase of the given fraction of the drive voltage wherein the voltage division circuit comprises a voltage limiter which in operation provides a further phase shift to the given fraction of the drive voltage when the drive voltage exceeds a given threshold value, thereby causing or permitting a resonant frequency of the inverter to increase and limit a peak drive voltage.

2. The drive circuit as claimed in claim 1 wherein the voltage limiter comprises:

a diode clipper coupled to an output of the voltage division circuit.

3. The drive circuit as claimed in claim 1 or 2, wherein the voltage division circuit comprises a plurality of capacitors in a series arrangement.

4. The drive circuit as claimed in claim 1 or 2 wherein phase shifting means comprises:

a circuit having an inductance connected in series with the tank circuit.

5. A drive circuit arrangement for a gas discharge lamp, comprising:

a self resonating inverter for providing a drive voltage across a load having a reactive component, the inverter having a pair of field effect transistors which operate in anti-phase;

a tank circuit for canceling the reactive component of a load impedance coupled to the inverter in use;

a voltage division circuit which provides a given fraction of the drive voltage to the gates of the pair of field effect transistors in use; and phase shifting means for shifting the phase of the given fraction of the drive voltage;

wherein the voltage division circuit comprises a voltage limiter which in operation provides a further phase shift to the given fraction of the drive voltage when the drive voltage exceeds a given threshold value, thereby causing or permitting a resonant frequency of the inverter to increase and limit a peak drive voltage, and the voltage limiter comprises a diode clipper coupled to the output of the voltage division circuit.

6. The drive circuit as claimed in claim 5, wherein the voltage division circuit comprises:

a plurality of capacitors in a series arrangement.

7. The drive circuit as claimed in claim 5 or 6, wherein the phase shifting means comprises:

a circuit having an inductance connected in series with the tank circuit.

* * * * *